Feb. 17, 1925.
I. DROLSHAMMER
1,527,127
COMPRESSED AIR BRAKE FOR RAILWAY VEHICLES AND THE LIKE
Filed Aug. 16, 1924   4 Sheets-Sheet 1
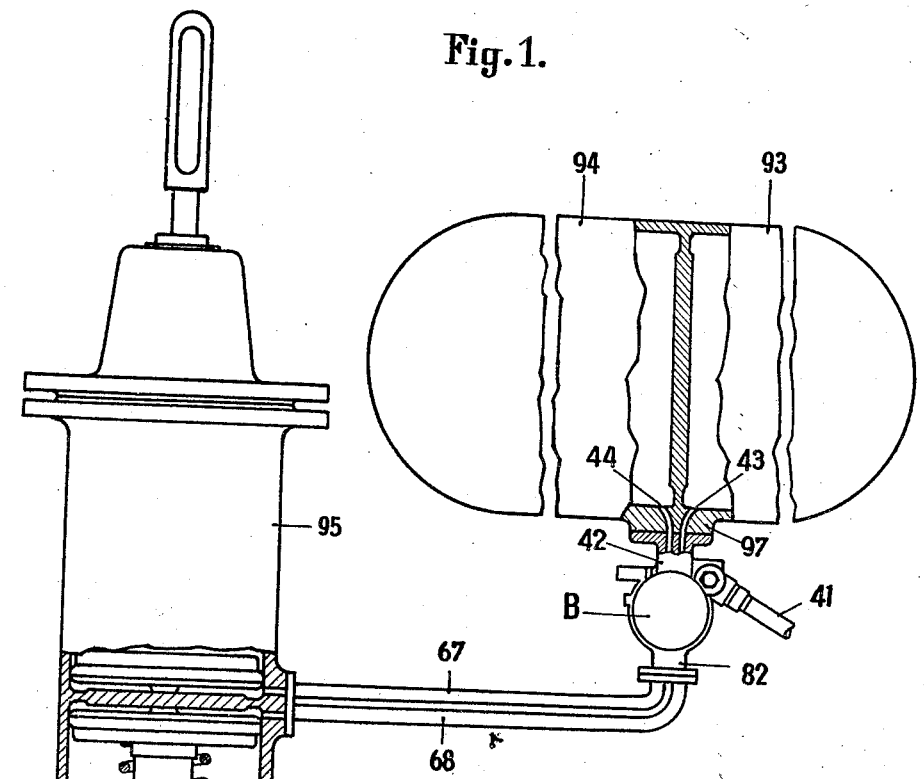
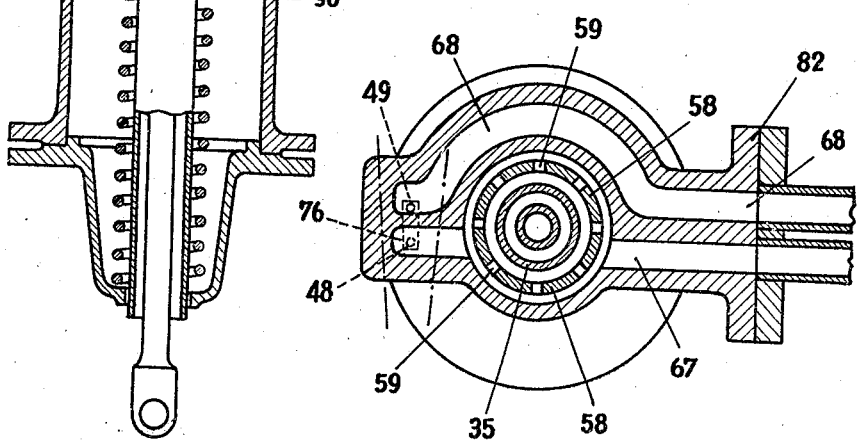
Inventor:
Ivar Drolshammer Feb. 17. 1925.　　　　　　　　　　　　　　　　　　1,527,127
I. DROLSHAMMER
COMPRESSED AIR BRAKE FOR RAILWAY VEHICLES AND THE LIKE
Filed Aug. 16, 1924　　　4 Sheets-Sheet 3

Inventor:
Ivar Drolshammer

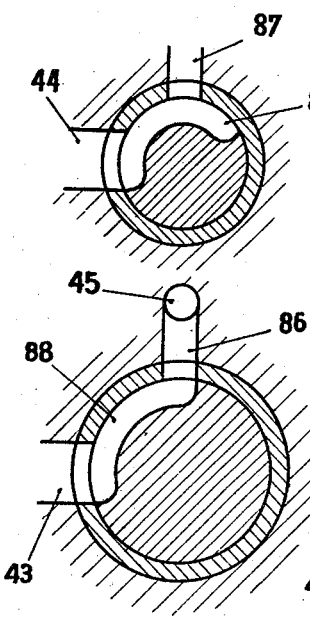
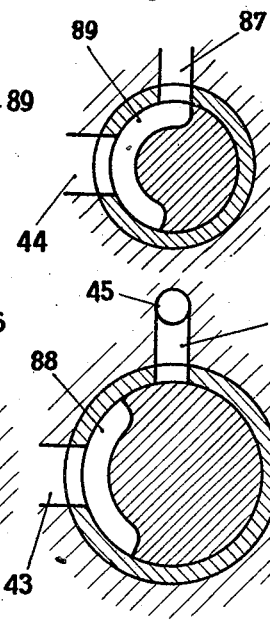
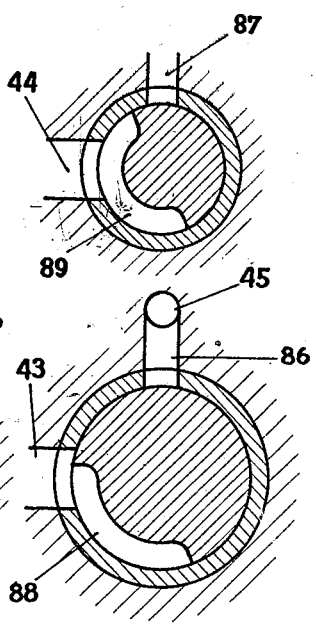

Patented Feb. 17, 1925.

1,527,127

UNITED STATES PATENT OFFICE.

IVAR DROLSHAMMER, OF DRAMMEN, NORWAY.

COMPRESSED-AIR BRAKE FOR RAILWAY VEHICLES AND THE LIKE.

Application filed August 16, 1924. Serial No. 732,539.

*To all whom it may concern:*

Be it known that I, IVAR DROLSHAMMER, a subject of the King of Norway, residing at Drammen, Norway, Byfogd Lyches Gate 7, have invented certain new and useful Improvements in Compressed-Air Brakes for Railway Vehicles and the like, of which the following is a specification.

According to this invention, which relates to compressed air brakes for railway vehicles and the like, more particularly goods trains, a plurality of brake cylinders, capable of operating collectively to apply a brake for a heavy load, are associated with a single regulating and control valve whereby the said cylinders are in one position of the said valve connected to each other in parallel, whereas by changing the position of the valve single cylinders can successively be put out of action, to reduce the brake effort for smaller loads. Means are provided whereby the time required for filling the cylinders is kept constant, or substantially so, though the number of cylinders in operation varies. Auxiliary air reservoirs are or may be provided, severally associated with the brake cylinders, and when the brake is first applied only those reservoirs are re-charged, which belong to brake cylinders in operation at the time. I may provide means whereby when the brake cylinders are cut off from the compressed air supply, they are connected to atmosphere, to prevent accumulation of air pressure therein, due to leakage.

The invention is illustrated in the accompanying drawing, showing an example of apparatus, embodying the same as applied to a two-cylinder compressed air brake.

Fig. 1 is an elevation, partly in section, showing the apparatus as a whole.

Fig. 7 is a section of another part of the valve mechanism.

Figure 2:
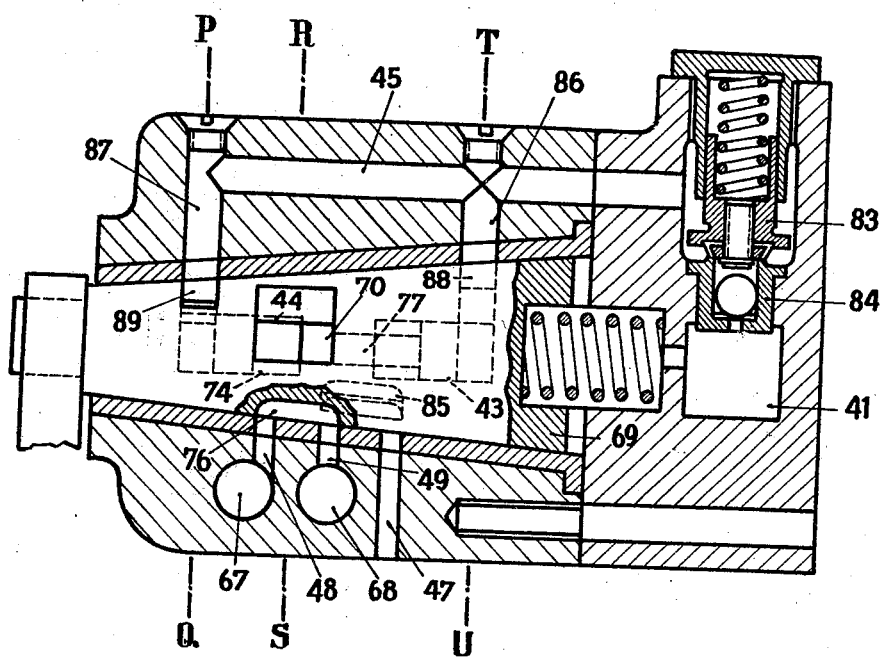
Figs. 2 and 3 are sections, in planes perpendicular to each other, of the control valve.
Figure 3:
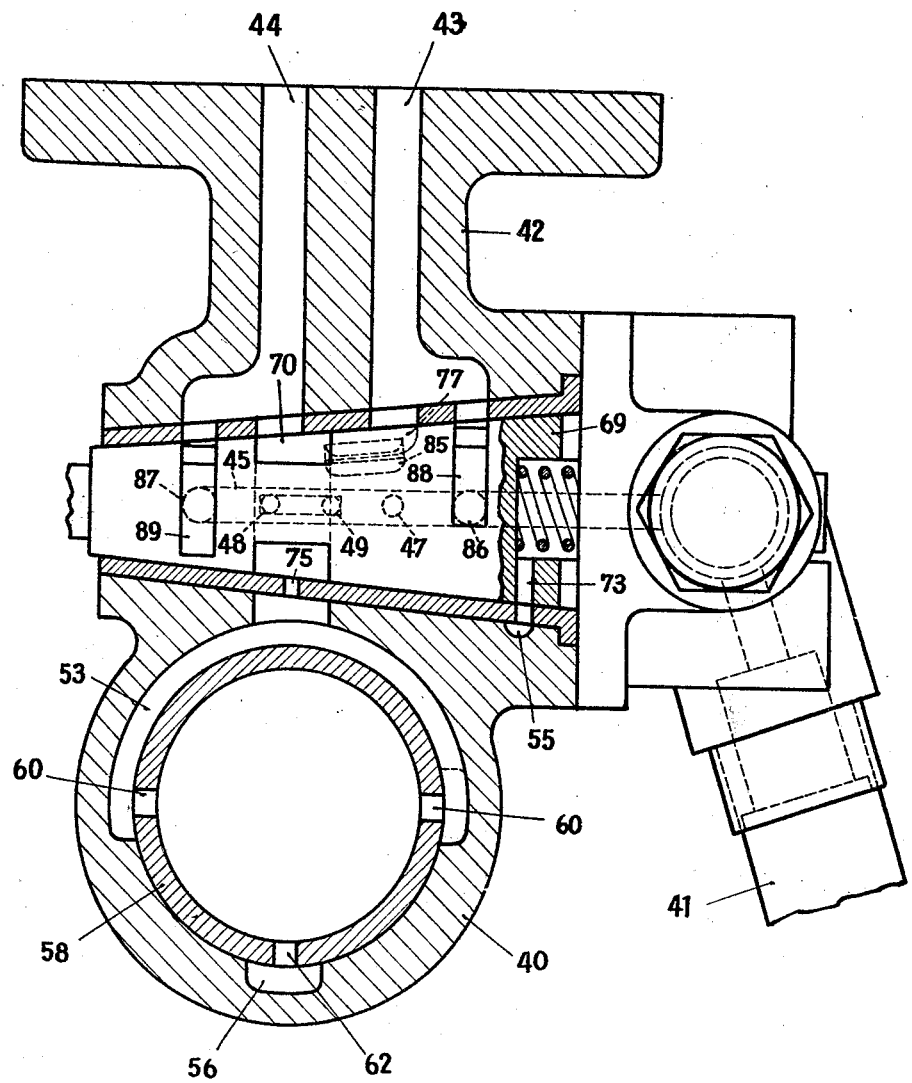

The main pipe 41 supplies compressed air by way of a valve box, which contains a valve B, and ports 43, 44 to auxiliary air reservoirs 93, 94, which are fixed to a union 42. Air flows from the main conduit 41 direct over the two check valves 84 and 83 and through the passage 45, openings 86 and 87, recesses 88 and 89 in the valve plug 69 to the channels 43 and 44. Furthermore air flows from the main conduit 49 in front of the check valves 84 and 83 directly through the channel 73 in the valve plug 69 and through the channel 55 in the casing towards the upper side of the control piston for the brake control valve. From the valve box two pipes 67, 68 lead to the brake cylinders 95 and 96. Rotation of the plug 69 to the position shown in Fig. 4 enables air to flow rapidly from the reservoirs 93, 94 through passages 70, 77 and 74 of the plug 69 and a channel 46 to the valve B and through the passages 59 therein to the pipe 67. By means of a channel 76 in the plug 69 the pipe 67 is connected in parallel with the pipe 68, so that both brake cylinders receive compressed air. Air from the reservoirs 93, 94 flows also at a slower rate through a smaller passage 75 in the plug 69 and by way of the valve B to the pipes 67, 68. Thus the brake cylinders receive air along two paths, one direct and the other indirect. In practice the passage 75 may, for example, be so proportioned that with a 100 mm. stroke of the brake piston both brake cylinders are filled in about 35 seconds. This setting of the mechanism may be suitable for heavy goods trains.

To change over to a light train, the plug is turned to break the connection of the pipes 67 and 68 by means of the passage 76, so that only the pipe 67 remains effective. By the same means the wide passage 74 is removed from the passage or port 75, and a small passage 71 is substituted therefor, the effect being that to charge the single brake cylinder retained in service (viz the cylinder 95) the same length of time is required as previously to charge both cylinders.

Figure 6:
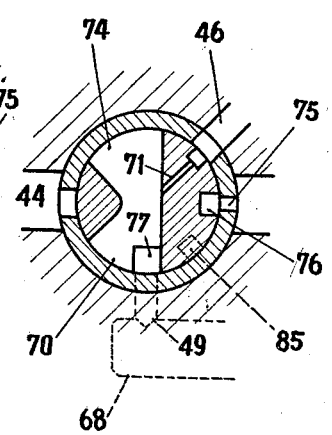

By turning the plug 69 to the position shown in Fig. 6 the passage of compressed air to the valve B is cut-off entirely.

Figure 4:
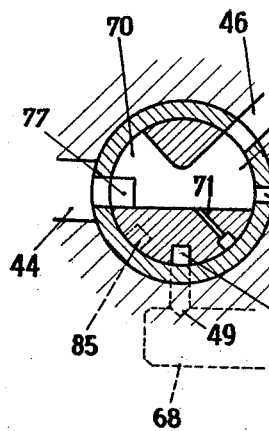
Figs. 4, 5 and 6 are sectional views of the valve in three different positions, each Figure comprising three sections in different planes.

The path for the air to the auxiliary reservoirs from the supply channel 45 is by way of two channels 86, 87, passages 88 and 89 in the cock 69, and the ports 43, 44, all these being open when the plug is set as shown in Fig. 4. With the plug turned to the position shown in Fig. 5 the flow from the channel 45 to the passage 88 and thence to the port 43 is cut-off.

Figure 5:
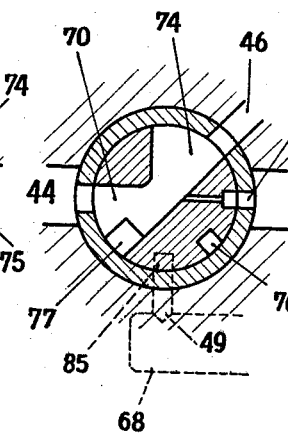

To prevent the possibility of pressure accumulating in the brake cylinder 96, owing to leakage, when the plug 96 is set as shown in Fig. 5, the pipe 68 is then connected with a vent passage 47 by means of a passage 85 in the plug. With the plug in the position shown in Fig. 6 both the brake cylinders are connected to the vent 47, by way of the pipes 67, 68, and passages 77, 70 in the plug. The auxiliary air reservoirs, on the other hand, remain closed. This has the advantage that single vehicles can be braked, in shunting operations, the plug 69 being moved to the position shown in Figs. 4 or 5 by means of a lever provided for that purpose, and being returned to the Fig. 6 position for releasing the brake. The supply of air in the reservoirs is sufficient for several applications of the brake.

What I claim as my invention and desire to secure by Letters Patent of the United States is:—

1. In compressed air brake mechanism the combination of a plurality of brake cylinders, a compressed air supply conduit, and a multiway valve whereby all said cylinders can be connected in parallel to said conduit and whereby said cylinders can be cut-off successively from connection with said conduit, said valve having passages so proportioned that the rate of filling the cylinders with compressed air is substantially constant, whatever number of cylinders are connected to the supply conduit.

2. The combination claimed in claim 1, together with auxiliary air reservoirs connected to the valve, one for each brake cylinder, the valve having passages whereby on charging the brake mechanism with compressed air, only those reservoirs are charged which belong to the cylinders which are in communication with the supply conduit through the valve.

3. The combination claimed in claim 1 the valve having passages whereby it places the cylinders in communication with the atmosphere when it cuts them off from connection with the supply pipe.

4. The combination claimed in claim 1, the valve being a cock having a single plug wherein are the feed passages for the cylinders, the passages for connecting the cylinders in parallel, the feed passages for the air reservoirs, and the passages for connecting the cylinder to atmosphere.

In testimony whereof, I have signed my name to this specification at Munich this 3d day of July, 1924.

IVAR DROLSHAMMER.